(12) United States Patent
Aoki (10) Patent No.: US 8,500,169 B2
(45) Date of Patent: Aug. 6, 2013

(54) SADDLE-RIDE TYPE VEHICLE

(75) Inventor: Koji Aoki, Saitama (JP)

(73) Assignee: Honda Motor Co., Ltd, Tokyo (JP)

(*) Notice: Subject to any disclaimer, the term of this patent is extended or adjusted under 35 U.S.C. 154(b) by 91 days.

(21) Appl. No.: 13/030,491

(22) Filed: Feb. 18, 2011

(65) Prior Publication Data

US 2011/0204613 A1 Aug. 25, 2011

(30) Foreign Application Priority Data

Feb. 23, 2010 (JP) ................................. 2010-037498

(51) Int. Cl.
*B65D 88/12* (2006.01)
(52) U.S. Cl.
USPC ............ 280/835; 280/834; 280/833; 180/219
(58) Field of Classification Search
USPC .......................... 280/835, 834, 833; 180/219
See application file for complete search history.

(56) References Cited

U.S. PATENT DOCUMENTS

| 5,884,380 | A * | 3/1999 | Thurm ......................... 29/401.1 |
| 6,213,514 | B1 * | 4/2001 | Natsume et al. .............. 280/833 |
| 6,341,792 | B1 * | 1/2002 | Okuma ...................... 280/304.3 |
| 7,690,689 | B2 * | 4/2010 | Muroo et al. ................. 280/833 |
| 7,712,564 | B2 * | 5/2010 | Schmidt et al. ............... 180/219 |
| 2004/0124628 | A1 * | 7/2004 | Kurayoshi et al. ............ 280/835 |
| 2006/0175112 | A1 * | 8/2006 | Yoshida et al. ............... 180/229 |
| 2007/0200332 | A1 * | 8/2007 | Muroo et al. ................. 280/833 |
| 2009/0166364 | A1 * | 7/2009 | Shimomura .................. 220/562 |

FOREIGN PATENT DOCUMENTS

JP 2009-161016 A 7/2009

* cited by examiner

*Primary Examiner* — Kevin Hurley
*Assistant Examiner* — Michael Stabley
(74) *Attorney, Agent, or Firm* — Birch, Stewart, Kolasch & Birch, LLP (57) ABSTRACT

A saddle-ride type vehicle which for preventing the fuel tank from receiving a load imposed on the tank cover and for achieving a weight reduction of the fuel tank. A motorcycle includes a vehicle body frame; a fuel tank, fixed to the vehicle body frame, for storing fuel; a tank cover for covering at least part of the fuel tank; a flange part, provided to the fuel tank, for fastening the fuel tank to the vehicle body frame; and a cover supporting member, fastened to the flange part, for supporting the tank cover.

16 Claims, 10 Drawing Sheets

SADDLE-RIDE TYPE VEHICLE

CROSS-REFERENCE TO RELATED APPLICATIONS

The present application claims priority under 35 USC 119 to Japanese Patent Application No. 2010-037498 filed on Feb. 23, 2010 the entire contents of which are hereby incorporated by reference.

BACKGROUND OF THE INVENTION

1. Field of the Invention

The present invention relates to a saddle-ride type vehicle which includes a fuel tank covered with a cover member.

2. Description of Background Art

A saddle-ride type vehicle whose fuel tank is covered with a tank cover has been heretofore known. See, for example, Japanese Patent Application Publication No. 2009-161016.

The saddle-ride type vehicle described in Japanese Patent Application Publication No. 2009-161016 includes an integrally-molded center cover in which an opening corresponding to a position of a fuel filler neck is made and paired left and right side covers molded separately from the center cover and disposed on the respective left and right sides of the center cover in such a way as to cover the fuel tank from its sides. The saddle-ride type vehicle is configured in that the center cover and the side covers (hereinafter these covers are referred to as a "tank cover" depending on the necessity) are fastened to the fuel tank with bolts.

However, in the saddle-ride type vehicle described in Japanese Patent Application Publication No. 2009-161016, the tank cover is fastened to the fuel tank with the bolts. For this reason, when an excessive load is applied to the tank cover, the fuel tank receives the load, and thus may be deformed or subjected to other risks.

With this taken into consideration, the strength of the fuel tank needs to be increased to such a degree that the fuel tank is not easily deformed even when receiving a load through the tank cover, by taking measures such as increasing the thickness of a steel plate constituting the fuel tank. This makes it difficult to decrease the weight of the fuel tank.

SUMMARY AND OBJECTS OF THE INVENTION

An object of an embodiment of the present invention is to provide a saddle-ride type vehicle which is capable of preventing the fuel tank from receiving a load imposed on the tank cover and of achieving weight reduction of the fuel tank.

According to an embodiment of the present invention, a vehicle body frame is provided with a fuel tank, fixed to the vehicle body frame, for storing fuel; a tank cover for covering at least part of the fuel tank; a flange part, provided to the fuel tank, for fastening the fuel tank to the vehicle body frame; and a cover supporting member, fastened to the flange part, for supporting the tank cover.

According to an embodiment of the present invention, the tank cover comprises a front tank cover for covering a front portion of the fuel tank; and paired front tank side covers disposed on two sides of the front tank cover in a vehicle width direction, the paired front tank side covers covering at least parts of side surfaces of the fuel tank, respectively, and the front tank cover and the front tank side covers are jointly fastened and fixed to the cover supporting member.

According to an embodiment of the present invention, the paired cover supporting members are disposed with a fastening part interposed in between in the vehicle width direction, the fastening part being formed in the flange part and fastened to the vehicle body frame, and each of the cover supporting members is fastened to the flange part by use of a single fastening shaft member.

According to an embodiment of the present invention, the cover supporting member includes a plurality of cover fastening parts for fastening the tank cover, and the plurality of cover fastening parts are disposed with a fastening part interposed in between in the vehicle width direction. The fastening part formed in the flange part and fastened to the vehicle body frame are integrally formed.

According to an embodiment of the present invention, paired side covers are provided that are disposed to continue to rear portions of the front tank side covers, the side covers covering at least parts of the side surfaces of the fuel tank, respectively. The fuel tank includes cover locking parts for respectively locking the front tank cover, the front tank side covers, and the side covers, and the front tank cover, the front tank side covers, and the side covers each include a tank locking part configured to engage with a corresponding one of the cover locking parts.

According to an embodiment of the present invention, the front tank cover includes paired cover supporting member fastening parts, which are configured to be fastened to the cover supporting member, in its respective two end portions in the vehicle width direction, and the tank locking parts are disposed in the rear of the respective cover supporting member fastening parts.

According to an embodiment of the present invention, the tank cover is fastened to the cover supporting member fastened to the flange part. This means that the tank cover is not directly fastened to the fuel tank. Thereby, even when an excessive load is applied to the tank cover, it is possible to inhibit the fuel tank from receiving the load. Accordingly, a reduction in the weight of the fuel tank can be achieved.

According to an embodiment of the present invention, the front tank cover and the front tank side covers are jointly fastened and fixed to the cover supporting member. For this reason, even in the case where the periphery of the fuel tank is covered with the multiple tank covers, it is possible to reduce the number of the fastening members and the like. Thus, a reduction in the weight of the fuel tank is achieved.

According to an embodiment of the present invention, the cover supporting members are fastened to the flange part by use of their respective single fastening members. For this reason, once an excessive load is applied to the tank cover and this load acts on the cover supporting members, the cover supporting members turn on their respective fastening shaft members with respect to the flange part. Accordingly, it is possible to ease the load which is applied to the tank cover and the flange part.

According to an embodiment of the present invention, the multiple cover fastening parts of the cover supporting member are disposed with the fastening part interposed in between in the vehicle width direction, and are integrally formed, the fastening part formed in the flange part and fastened to the vehicle body frame. For this reason, clearances between the fuel tank and the multiple tank covers can be managed collectively by use of the cover supporting member. Accordingly, it is possible to enhance the productivity of the motorcycle.

According to an embodiment of the present invention, the fuel tank is locked to the front tank cover, the front tank side covers, and the side covers by making the tank locking parts and the cover locking parts engage with each other. For this reason, even when an excessive load is applied to the front tank cover, the front tank side covers, and the side covers, it is possible to inhibit the load from acting on the fuel tank. Moreover, the clearances between these covers and the fuel tank can be set to a minimum. For this reason, it is possible to make the fuel tank of the motorcycle compact, and to make the external appearance of the motorcycle better.

According to an embodiment of the present invention, the front tank cover includes the paired cover supporting member fastening parts, which are fastened to the cover supporting member, in its respective two end portions in the vehicle width direction. Furthermore, the tank locking parts are disposed in the rear of the respective cover supporting member fastening parts. For this reason, the two end portions of the front tank cover in the vehicle width direction can be fastened and thereby fixed to the paired cover supporting member fastening parts. Accordingly, even in a case where the weight of the front tank cover is reduced by thinning the front tank cover down, it is possible to inhibit the deformation of the front tank cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
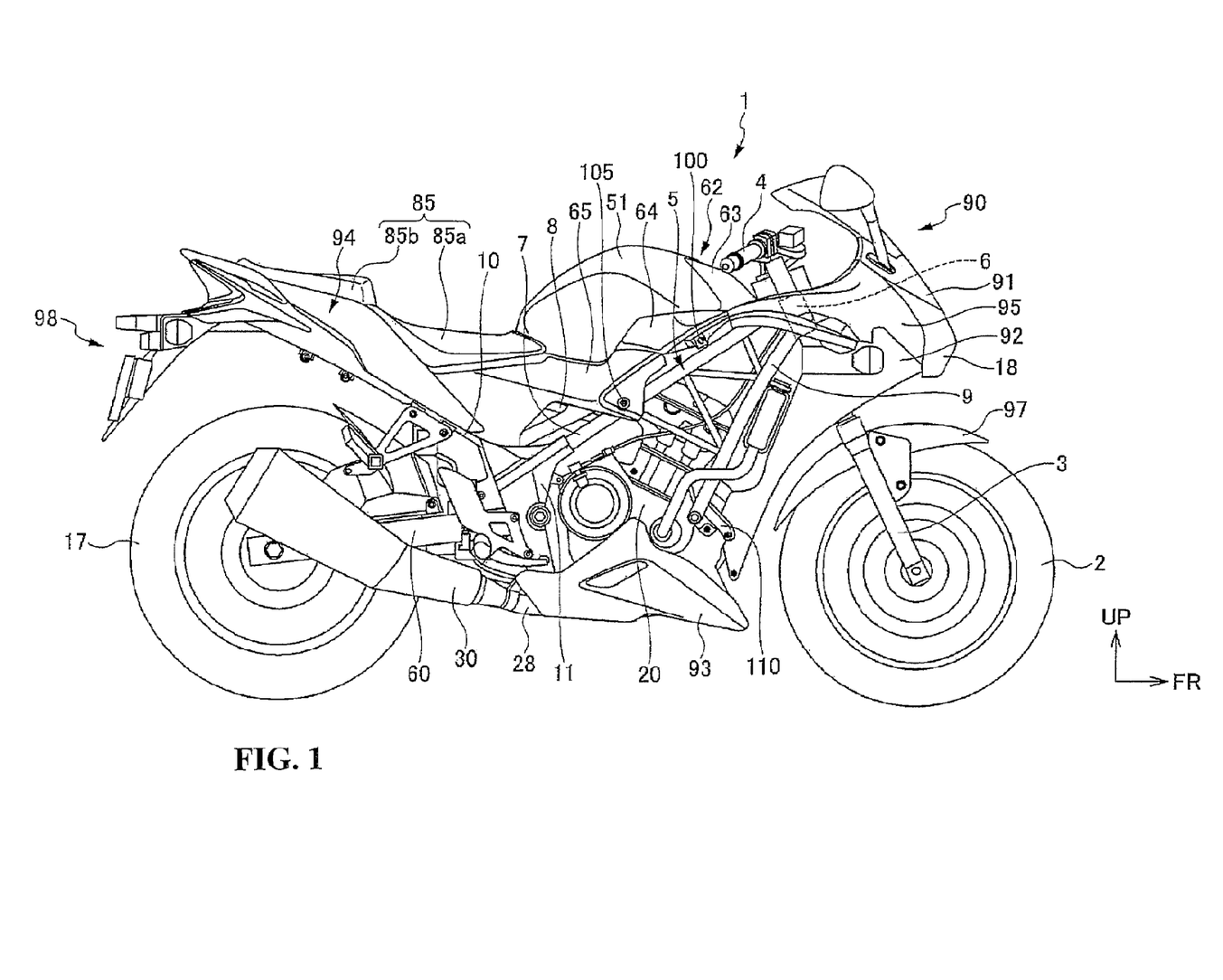
FIG. 1 is a right side view showing a motorcycle according to a first embodiment of the present invention.
Figure 2:
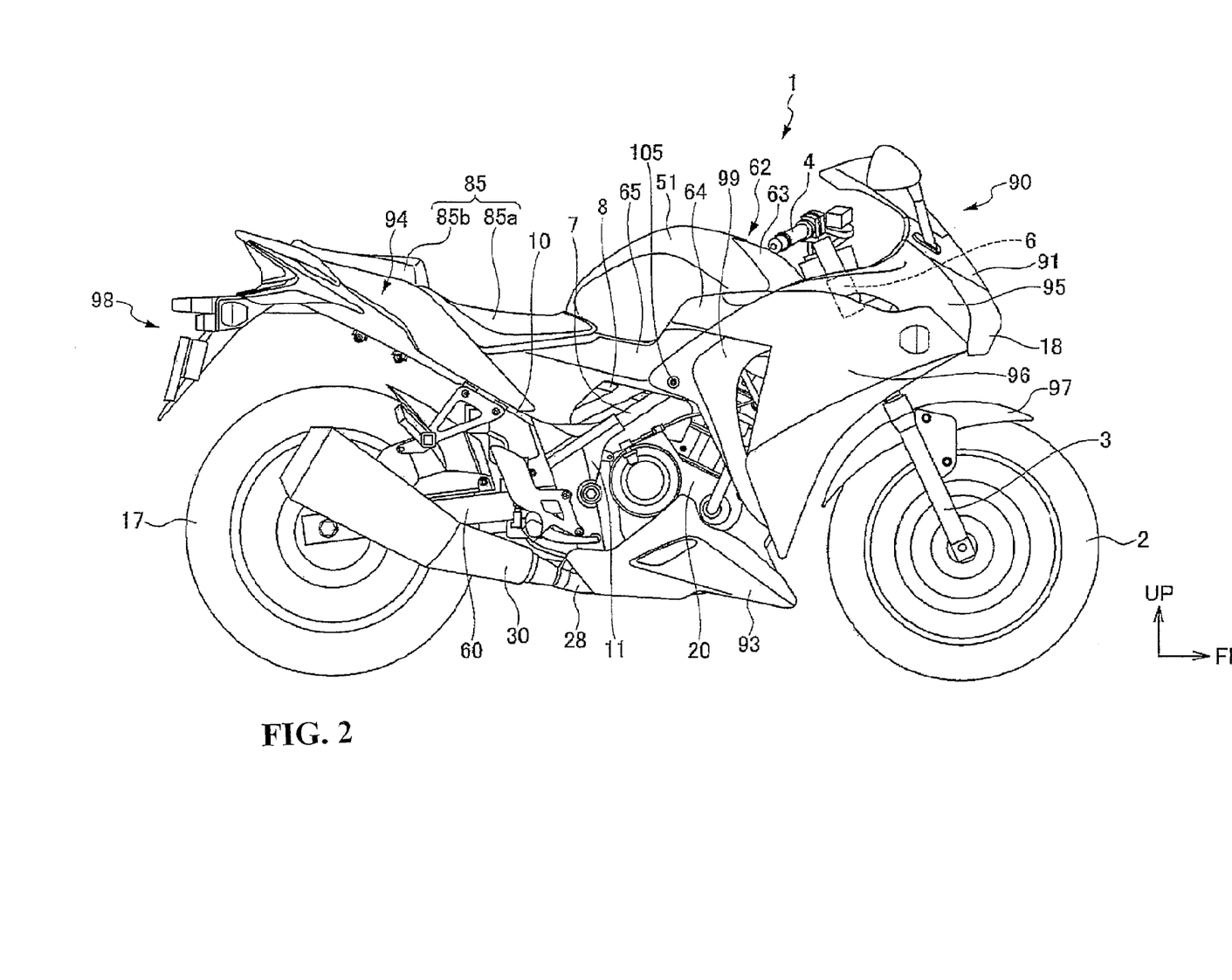
FIG. 2 is a right side view showing the motorcycle according to the first embodiment of the present invention.

Referring to the drawings, descriptions will be hereinbelow provided for a first embodiment of the present invention. A motorcycle will be described as a saddle-ride type vehicle according to the first embodiment. FIG. 1 and FIG. 2 are right side views each showing the motorcycle according to the first embodiment of the present invention. FIG. 1 shows the motorcycle from which some cover members are detached. FIG. 2 shows the motorcycle to which all the cover member are attached to the vehicle body. Note that frontward, rearward, leftward, rightward, upward, and downward directions in the description given below are based on views from an occupant (rider) riding the saddle-ride type vehicle unless otherwise specified. In addition, in the drawings, an arrow FR denotes a direction toward the front of the vehicle; an arrow LH denotes a direction toward the left side of the vehicle; and an arrow UP denotes a direction toward the upper side of the vehicle.

First of all, referring to FIG. 1, descriptions will be provided for an overall configuration of the motorcycle 1. As shown in FIG. 1, the motorcycle 1 according to this embodiment mainly includes a vehicle body frame 5; a front wheel 2; front forks 3 for pivotally supporting the front wheel 2 and a handlebar 4 connected to the front forks 3. An engine 20 is suspended from the vehicle body frame 5. A rear wheel 17 is a driving wheel with a swing arm 60 vertically swingably attached to the vehicle body frame 5 with a rear shock absorber (not illustrated) interposed in between. The swing arm 60 pivotally supports the rear wheel 17 with a pivot plate 11 for connecting the swing arm 60 to the vehicle body frame 5 in a way wherein the swing arm 60 is vertically swingable. A fuel tank 51 is provided. In addition, a occupant-sitting seat 85; a headlamp 18; a body cover 90; a front fender 97; a rear fender 98; and a tank cover 62 (a front tank cover 63, front tank side covers 64, and side covers 65) for covering part of the fuel tank 51 are provided.

The vehicle body frame 5 is made by integrally connecting multiple types of steel products together by welding and the like. As shown in FIG. 1, the vehicle body frame 5 includes a head pipe 6, main frames 7, seat rails 8, down tubes 9, rear stays 10, and multiple cross members (not illustrated).

The head pipe 6 is disposed in a front end portion of the vehicle body frame 5, and supports the paired front forks 3 for pivotally supporting the front wheel 2.

The pair of main frames 7 is provided on the respective left and right sides. The paired main frames 7 extend diagonally downward and rearward from the head pipe 6 when viewed from the side. The lower end portions of the paired main frames 7 are connected to the pivot plates 11, respectively.

The pair of seat rails 8 is provided on the respective left and right sides. End portions of the paired seat rails 8 are connected to the main frames 7, and the other end portions of the paired seat rails 8 extend diagonally upward and rearward in a way to pitch relatively sharply, respectively, when viewed from the side.

The paired down tubes 9 extend diagonally downward and rearward from the head pipe 6, when viewed from the side. A mount plate (not illustrated) for supporting the engine 20 is fixed to the lower portions of the respective down tubes 9. Cover member fastening stays 110 for fastening part of the body cover 90 extend frontward from this mount plate.

The pair of rear stays 10 is provided on the respective left and right sides. End portions of the paired rear stays 10 are connected to the rear end portions of the paired pivot plates 11. The other end portions of the paired rear stays 10 extend diagonally upward and rearward in a way to pitch relatively sharply, and are connected to the rear portions of the paired seat rails 8, respectively.

The cross members (not illustrated) include, for example, pipe members extending in the leftward/rightward direction, for connecting the paired left and right frames (the main frames 7, the down tubes 9, the seat rails 8, and the like) together in the leftward/rightward direction.

The pair of front forks 3 is provided on the left and right sides. The upper end portions of the paired front forks 3 are connected to the lower end portion of the handlebar 4. The upper end portions of the paired front forks 3 are supported by a steering stem (not illustrated) rotatably and pivotally supported by the head pipe 6, and a bridge (not illustrated) fixed to the upper and lower ends of this steering stem. The lower end portions of the paired front forks 3 pivotally supports the front wheel 2 in a way that the front wheel 2 is rotatable.

The headlamp 18 is disposed in front of the head pipe 6 and above the front fender 97, and illuminates the front of the vehicle body. The headlamp 18 is fixed to a headlamp supporting stay (not illustrated) fixed to the vehicle body frame 5.

The engine 20 is a prime mover (for example, a 4-cycle single cylinder water-cooled engine) for the motorcycle 1. As shown in FIG. 1, the engine 20 is mounted in an almost central portion of the vehicle body frame 5 in the frontward/rearward direction. The engine 20 is disposed in a way that a crankshaft (not illustrated) extends in the leftward/rightward direction of the vehicle body. An exhaust pipe 28 through which to discharge an exhaust gas is connected to the engine 20. A muffler 30 for deadening exhaust noise is connected to the rear end portion of the exhaust pipe 28.

As shown in FIG. 1, the fuel tank 51 stores fuel which is supplied to the engine 20. The fuel tank 51 is disposed in the rear of the head pipe 6 and in front of the seat 85, and is fixed to the upper portion of the vehicle body frame 5 (the main frames 7 and the seat rails 8). Descriptions will be provided for a structure for fixing the fuel tank 51 to the vehicle body frame 5 later.

The occupant-sitting seat 85 includes a main seat 85a on which the rider sits; and a pillion seat 85b on which a passenger sits in back of the rider. The occupant-sitting seat 85 is supported by the upper portions of the paired seat rails 8.

Next, referring to FIG. 1 and FIG. 2, descriptions will be provided for the body cover 90. The body cover 90 is that for covering the vehicle body frame 5. The body cover 90 includes a front center upper cover 91, front upper side covers 95, an inner cowl 92, first front side cowls 96, second front side cowls 99, an under cowl 93, and a rear cowl 94.

As shown in FIG. 1 and FIG. 2, the front center upper cover 91 is disposed over the headlamp 18 and in front of the head pipe 6, and is fastened to the front upper side covers 95 (which will be described later).

The pair of front upper side covers 95 is provided on the respective left and right sides, and are disposed on the respective side portions of the headlamp 18, as shown in FIG. 1 and FIG. 2. More specifically, the front upper side covers 95 are disposed between the headlamp 18 and the fuel tank 51, when viewed from the side, and cover the head pipe 6 from its sides. The front upper side covers 95 are each formed in an approximately triangular shape which tapers toward its rear from its front, when viewed from the side. The front portions of the front upper side covers 95 are fastened to the headlamp 18 or the headlamp supporting stay (not illustrated), while the lower end portions of the front upper side covers 95 are locked to the first front side cowls 96.

The pair of first front side cowls 96 are provided on the respective left and right sides, and are disposed under the front upper side covers 95, as shown in FIG. 2. The first front side cowls 96 are disposed in a way to cover the sides of each of the vehicle body frame 5 and the engine 20. When viewed from the side, the first front side cowls 96 are each formed in an approximately triangular shape which tapers toward the front from the rear, and are formed in such a shape that a part of the rear end portion is cut out into an almost triangular shape.

As shown in FIG. 2, the upper portions of the first front side cowls 96 are locked to the lower portions of the front upper side covers 95, while the lower portions of the first front side cowls 96 are fastened to the vehicle body frame 5 by use of the cover member fastening stays 110 (see FIG. 1). The rear portions of the first front side cowls 96 are fastened to the second front side cowls 99, respectively.

In addition, locking protrusions (not illustrated) are provided in the rear end-side inner surfaces of the upper portions of the first front side cowls 96, respectively. The first front side cowls 96 are locked, respectively, to the front tank side covers 64 by inserting these locking protrusions in locking parts 100 (see FIG. 1 and FIG. 9) with resin clips (not illustrated) interposed in between, the locking parts 100 provided in the lower end-side rear portions of the front tank side covers 64 (which will be described later).

The pair of second front side cowls 99 are provided on the respective left and right sides. As shown in FIG. 2, the second front side cowls 99 are connected to the rear portions of the first front side cowls 96, and are disposed in a way to cover the sides of each of the vehicle body frame 5 and the engine 20. The second front side cowls 99 are each formed in an approximately L shape, when viewed from the side. One end of each second front side cowl 99 is connected to a lower end edge in the upper portion of the corresponding first front side cowl 96, the lower end edge obtained by cutting out a part of the rear end portion. The other end thereof is connected to the lower portion of the corresponding first front side cowl 96.

More specifically, each second front side cowls 99 is connected to the corresponding first front side cowl 96 by overlapping a cowl alignment surface (not illustrated) of the second front side cowl 99 and a cowl alignment surface (not illustrated) of a corresponding one of the first front side cowls 96 together and fastening the overlapped portion together by use of a fastening member (not illustrated). The second front side cowl 99 integrated with the first front side cowl 96, together with a corresponding one of the side covers 65, is fastened and fixed to a fastening part 105 (see FIG. 1 and FIG. 2) situated in an almost central portion of the main frame 7 in the frontward/rearward direction.

The inner cowl 92 is disposed in the inner sides of the first front side cowls 96 in the vehicle width direction, and is fixed to the first front side cowls 96. The upper portions of the inner cowl 92 are locked to the respective lower portions of the front upper side covers 95. The lower portions of the inner cowl 92 are fastened to the respective cover member fastening stays 110 (see FIG. 1).

The under cowl 93 covers the exhaust pipe 28, which situated under the engine 20, from the two sides of the vehicle body. The under cowl 93 is formed in an approximately triangular shape which widens toward its rear from its front, when viewed from the side. The front-side upper portions of the under cowl 93 are fastened to the cover member fastening stays 110 (see FIG. 1). The rear portions of the under cowl 93 are fastened to the rear portions of the vehicle body frame 5.

The rear cowl 94 includes multiple cover members, and covers the rear portions of the seat rails 8 and the rear portions of the rear stays 10. When viewed from the side, the rear cowl 94 is in a shape which extends in a way to widen toward the pillion seat 85b from an almost central portion of the vehicle body, and in a way to taper rearwardly and upwardly.

The front fender 97 is fixed to the front forks 3, and covers the upper portion of the front wheel 2. The rear fender 98 is fixed to the seat rails 8, and covers the upper portion of the rear wheel 17.

Figure 3:
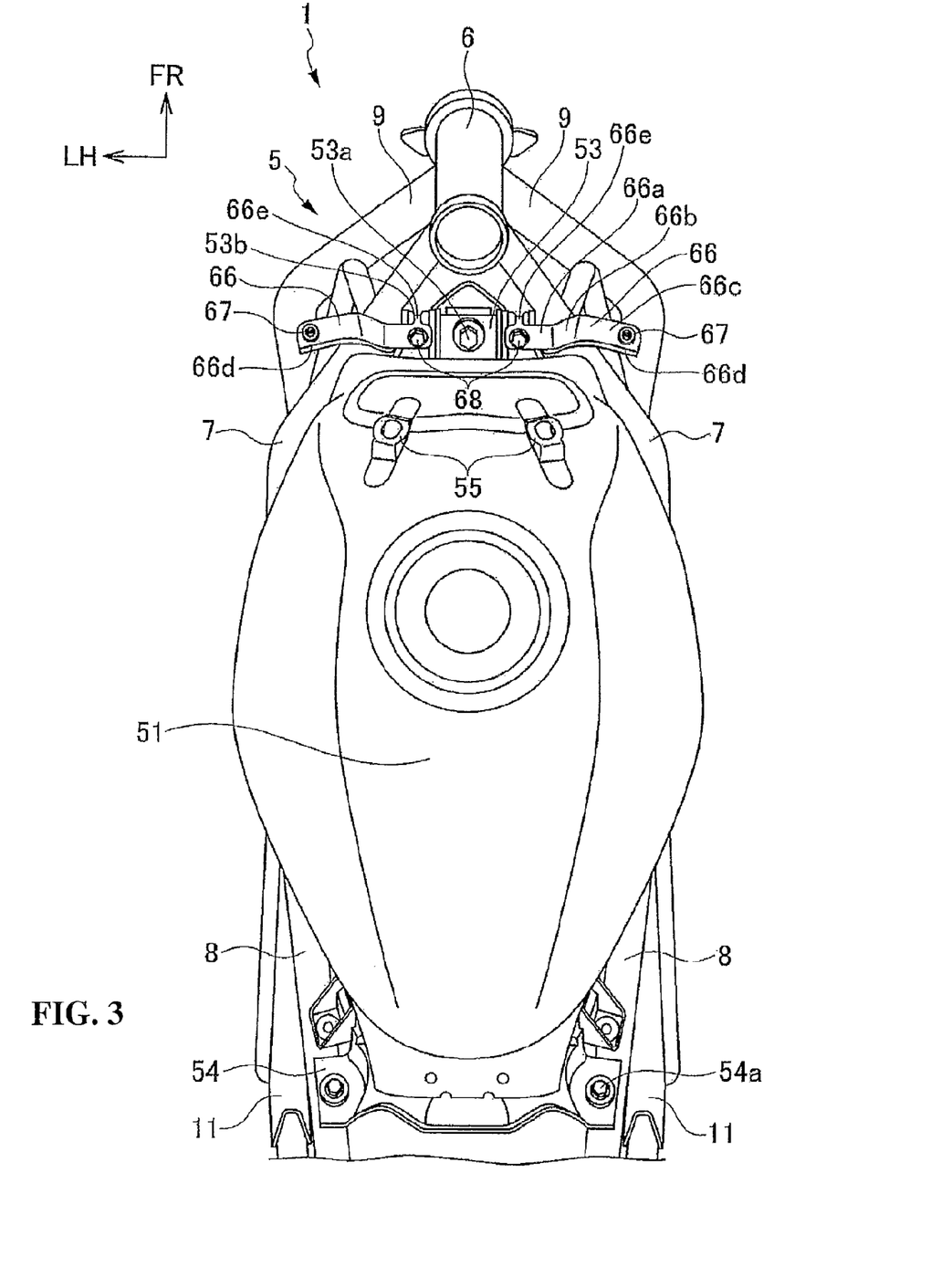
FIG. 3 is a plan view showing the motorcycle in which a tank cover is not attached to a fuel tank yet.
Figure 4:
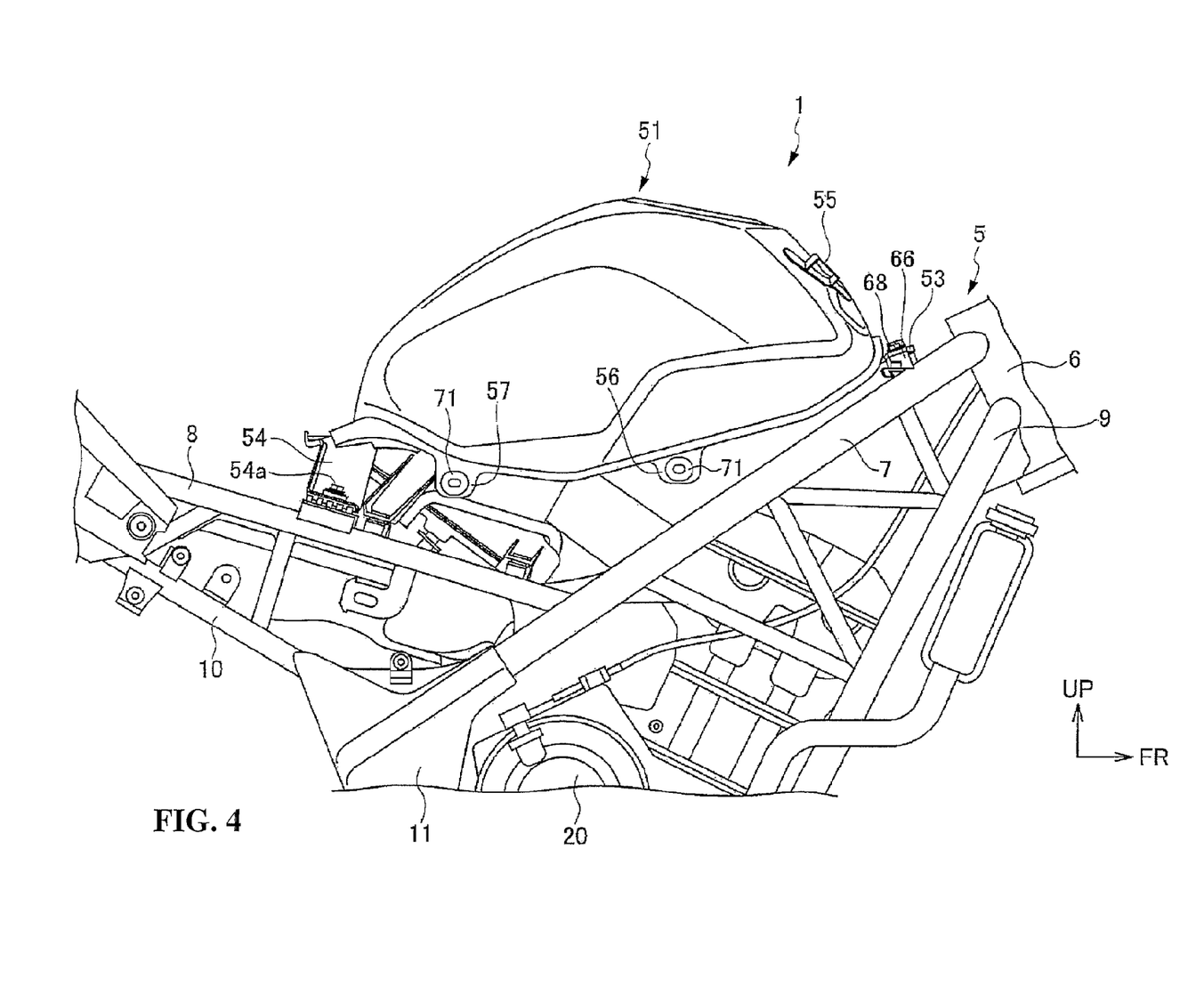
FIG. 4 is a right side view showing the motorcycle in which the tank cover is not attached to the fuel tank yet.
Figure 5:
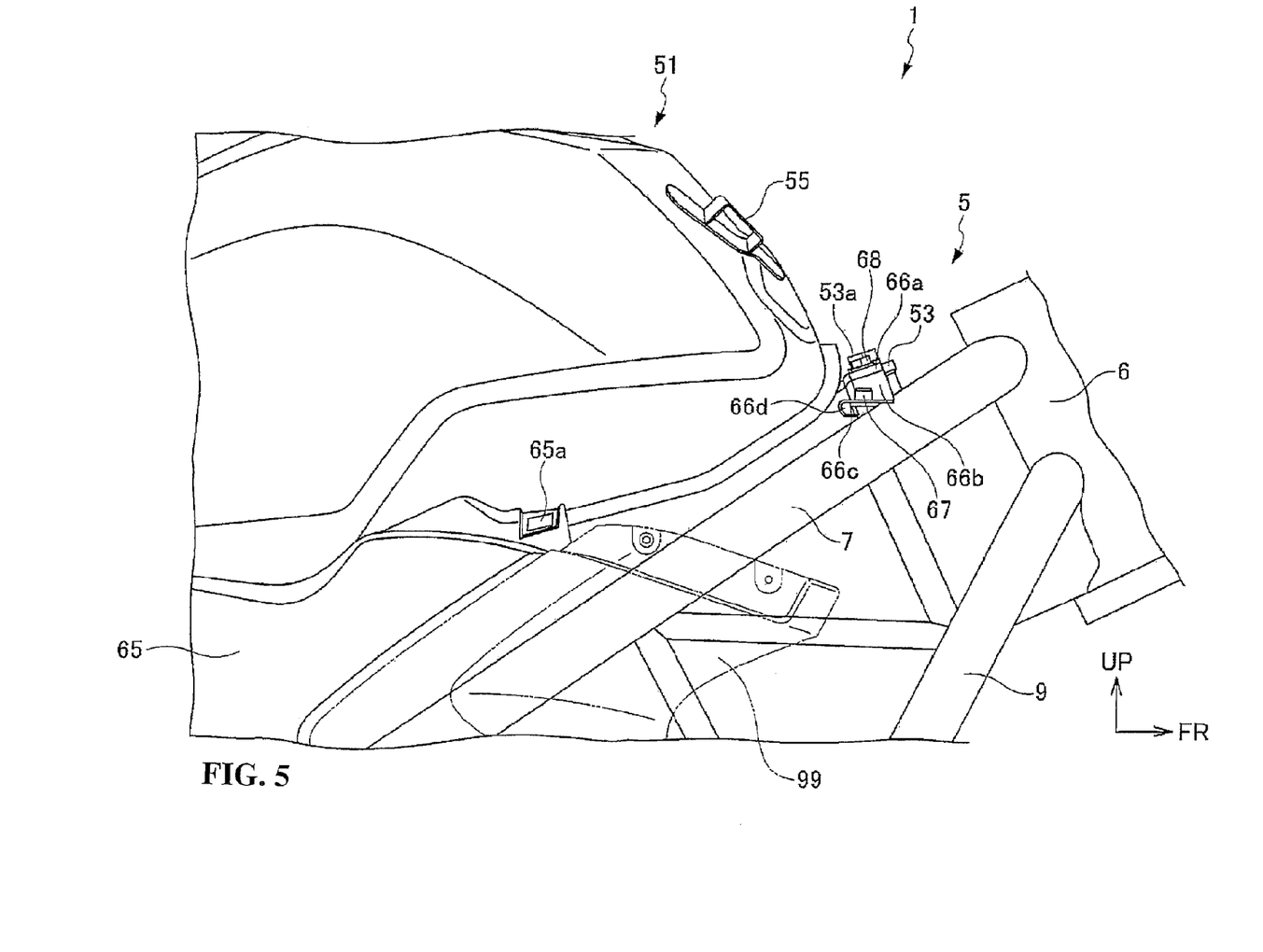
FIG. 5 is a right side view showing a cover supporting member 66 fastened to a flange part of the fuel tank.
Figure 6:
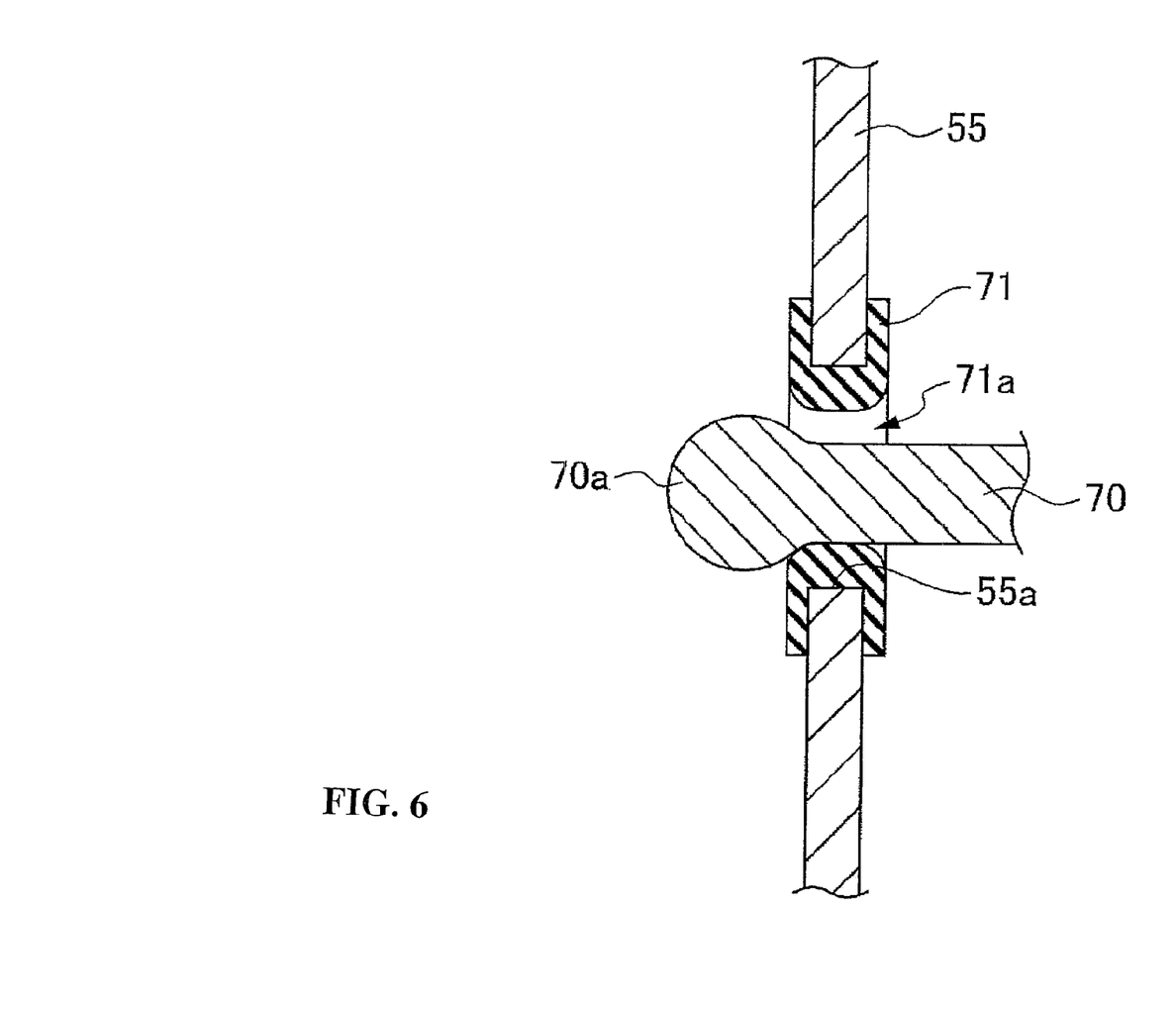
FIG. 6 is a magnified cross-sectional view showing how a tank locking part and a cover locking part are locked to each other.
Figure 7:
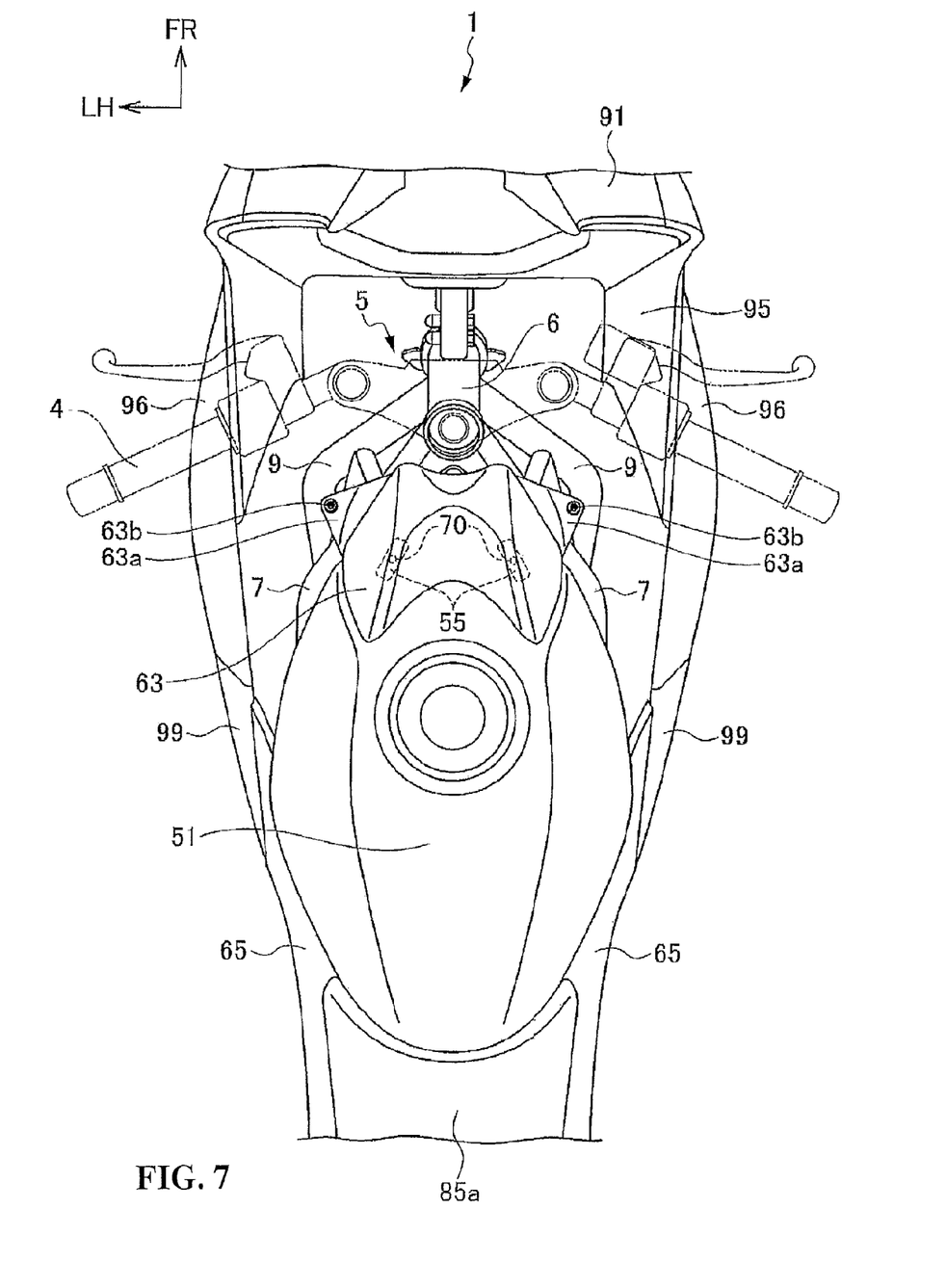
FIG. 7 is a plan view showing the motorcycle in which a front tank cover is attached to the fuel tank.
Figure 8:
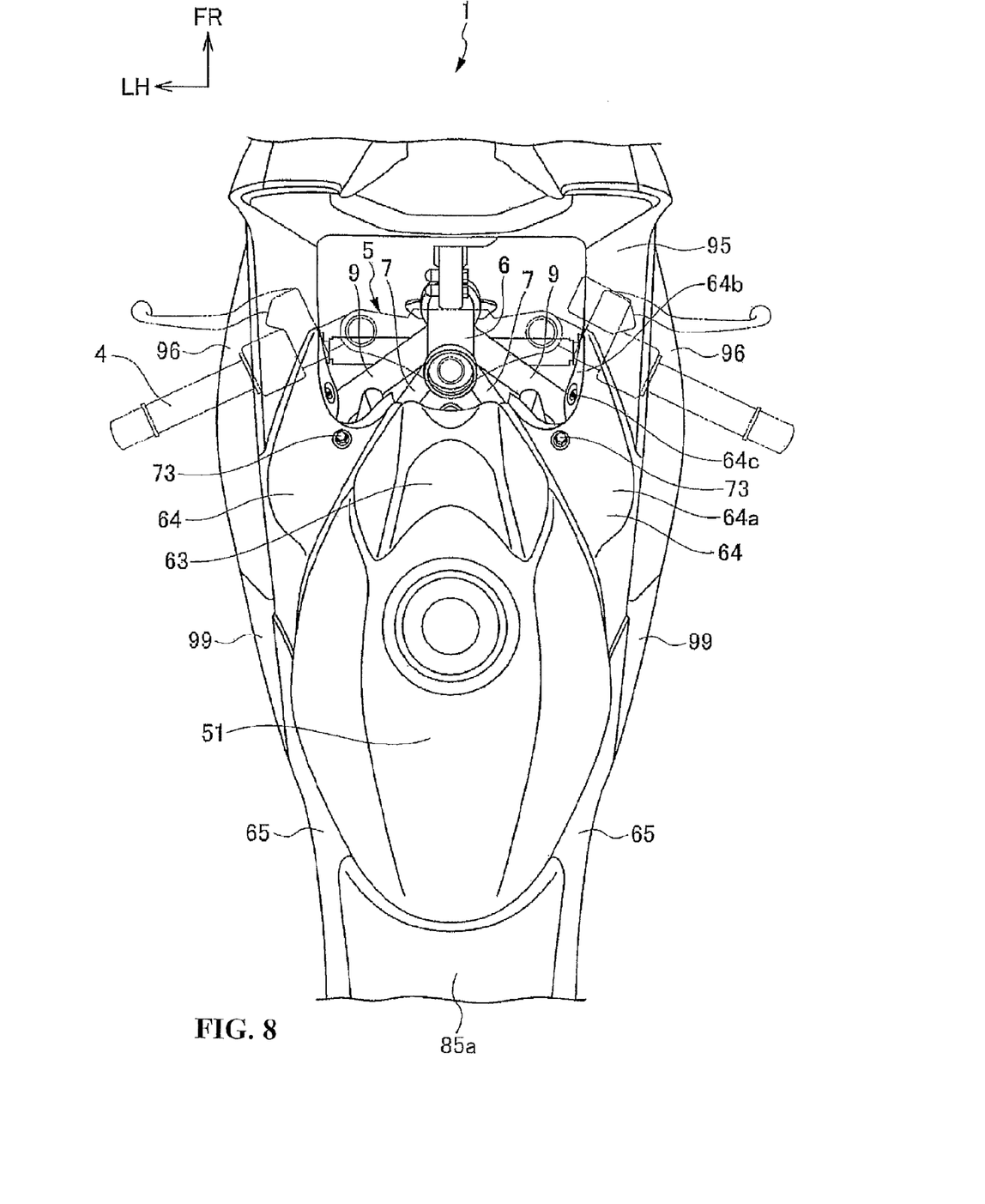
FIG. 8 is a plan view showing the motorcycle in which the front tank cover, front tank side covers, and side covers are attached to the fuel tank.
Figure 9:
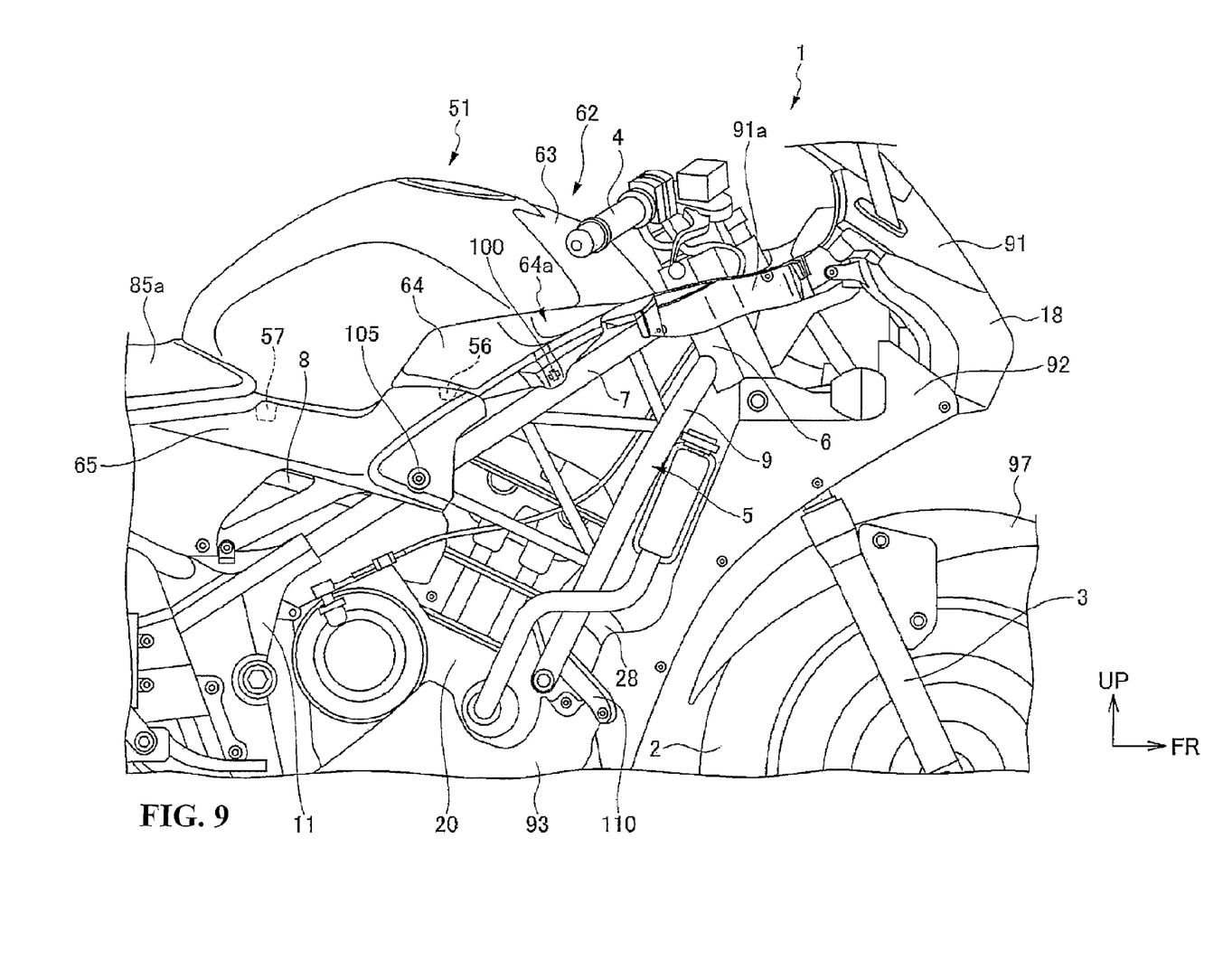
FIG. 9 is a right side view showing the motorcycle in which the front tank cover, the front tank side covers, and the side covers are attached to the fuel tank.

Next, referring to FIGS. 3 to 8, descriptions will be provided for a structure for fixing the tank cover 62 to the fuel tank 51 in the motorcycle 1, which is a feature of the present embodiment. FIG. 3 is a plan view showing the motorcycle in which the tank cover is not attached to the fuel tank yet. FIG. 4 is a right side view showing the motorcycle in which the tank cover is not attached to the fuel tank yet. FIG. 5 is a right side view showing a cover supporting member fastened to a flange part of the fuel tank. FIG. 6 is a magnified cross-sectional view showing how a tank locking part and a cover locking part are locked to each other. FIG. 7 is a plan view showing the motorcycle in which a front tank cover is attached to the fuel tank. FIG. 8 is a plan view showing the motorcycle in which the front tank cover, front tank side covers, and side covers are attached to the fuel tank. FIG. 9 is a right side view showing the motorcycle in which the front tank cover, the front tank side covers, and the side covers are attached to the fuel tank.

The motorcycle 1 according to this embodiment includes the above-described vehicle body frame 5, the fuel tank 51, the tank cover 62, a flange part 53, and cover supporting members 66.

As shown in FIG. 3 and FIG. 4, the fuel tank 51 is formed in the shape of an elongated ellipse which extends in the frontward/rearward direction, in a plan view and in a side view. The fuel tank 51 is formed from a steel plate with a predetermined thickness. As shown in FIGS. 3 to 5, the fuel tank 51 includes the flange part 53; front tank cover locking parts 55 as cover locking parts and cover first locking parts 56 and cover second locking parts 57 as the other cover locking parts.

As shown in FIGS. 3 to 5, the flange part 53 extends to the front in the shape of a plate from the lower end edge portion of the front portion of the fuel tank 51, and is formed integrally with the fuel tank 51. The flange part 53 is fastened to a stay part (not illustrated) of the vehicle body frame 5 by use of a flange part bolt 53a as a fastening part. The flange part 53 includes a pair of groove parts 53b (see FIG. 3) formed in its front edge and a penetration hole (not illustrated) in which to insert the flange part bolt 53a.

As shown in FIGS. 3 to 5, the paired front tank cover locking parts 55 are provided in the front portion of the fuel tank 51 in the vehicle width direction for the purpose of locking the tank locking parts 70 (which will be described later) of the front tank cover 63 (which will be described later). As shown in FIGS. 3 to 5, the front tank cover locking parts 55 are each formed by bending a metal plate (for example, a steel plate) in a way that the lengthwise cross section is shaped almost like a hat. The two end portions of each front tank cover locking part 55 are fixed to the fuel tank 51 by welding or by other processing.

As shown in FIGS. 3 to 6, each front tank cover locking part 55 includes a penetration hole 55a provided in an almost central portion in the lengthwise direction and an elastic member 71 engaging with this penetration hole 55a. The elastic member 71 is formed in the shape of a circular ring from a synthetic resin or the like, and is fitted around the penetration hole 55a. The elastic member 71 has a locking hole 71a in its central portion. A corresponding one of the tank locking part 70 (which will be described later) of the front tank cover 63 (which will be described later) engages with this locking hole 71a.

As shown in FIG. 4, each cover first locking part 56 extends downwardly from the lower end edge of an almost central portion of the fuel tank 51, when viewed from the side. The cover first locking part 56 is configured to be capable of locking a corresponding one of first tank locking parts (corresponding to the tank locking parts 70 which will be described later, although not illustrated), which are each provided in the back surface of the corresponding side cover 65. Because each cover first locking part 56 is formed in almost the same way as are the front tank cover locking parts 55 (see FIG. 6), duplicated description will be omitted.

As shown in FIG. 4, each cover second locking parts 57 extends downward from the lower end edge of a rear portion of the fuel tank 51, when viewed from the side. The cover second locking part 57 is configured to be capable of locking a corresponding one of second tank locking parts (corresponding to the tank locking parts 70 which will be described later, although not illustrated), which are each provided in the back surface of the corresponding side cover 65. Because each cover second locking part 57 is formed in almost the same way as are the front tank cover locking parts 55 (see FIG. 6), duplicated description will be omitted.

Next, descriptions will be provided for the cover supporting members 66. As shown in FIG. 3, the cover supporting members 66 are members, fastened to the flange part 53, for supporting the tank cover 62 (see FIG. 7). As shown in FIGS. 3 and 5, the cover supporting members 66 are each formed by bending a long metal-made plate member (for example, a steel plate). The cover supporting members 66 each include a base end part 66a, an inclined part 66b, a supporting part 66c, a bent part 66d and a rotation stop claw part 66e.

Each base end part 66a has a penetration hole (not illustrated) in which to insert a supporting member bolt 68. The end part 66a is fastened to the flange part 53 by use of the supporting member bolt 68 as a single fastening shaft member. The inclined part 66b extends obliquely downwardly from one end of the base end part 66a. The supporting part 66c extends almost horizontally from the lower end portion of the inclined part 66b.

Each supporting part 66c has a cover fastening part 67 for fastening the tank cover 62. More specifically, a female screw into which a joint-fastening bolt 73 is screwed is formed in the cover fastening part 67. This cover fastening part 67 enables the front tank cover 63 and the corresponding front tank side cover 64 to be fastened together by use of the joint-fastening bolt 73.

As shown in FIG. 5, each bent part 66d is formed extending in the vehicle width direction by bending the rear edge of the corresponding cover supporting member 66 downwardly. In other words, the bent part 66d is formed by bending downwardly the rear edges of the base end part 66a, the inclined part 66b and the supporting part 66c.

Each rotation stop claw part 66e is formed by being bent toward the flange part 53 (downwardly). The rotation stop claw part 66e is engaged with the corresponding groove part 53b of the flange part 53. The rotation stop claw part 66e restricts the rotational movement of the corresponding cover supporting member 66 about the supporting member bolt 68.

As shown in FIG. 3, the pair of cover supporting members 66 thus formed are disposed with a fastening part (the flange part bolt 53a) interposed in between in the vehicle width direction, the fastening part formed in the flange part 53 and fastened to the vehicle body frame 5.

Next, referring to FIGS. 7 to 9, descriptions will be provided for the tank cover 62. The tank cover 62 includes the front tank cover 63, the paired front tank side covers 64 and the paired side covers 65.

As shown in FIGS. 7 to 9, the front tank cover 63 is provided for covering a front portion of the fuel tank 51. As shown in FIG. 7, the front tank cover 63 is shaped almost like a trapezoid (a reverse trapezoid), when viewed in a plan view. In addition, the front tank cover 63 is formed in such a shape that a central portion of a front-side edge of this trapezoid is curved rearwardly in such a way so as to be slightly recessed.

A central portion of a rear-side edge of this trapezoid is curved to the front in such a way as to be recessed. Furthermore, as shown in FIG. 9, the front tank cover 63 is shaped almost like a trapezoid, when viewed from the side. The front tank cover 63 is made of a synthetic resin, for example.

The front tank cover 63 has paired cover supporting member fastening parts 63a in the respective two end portions of its front portion in the vehicle width direction. Each cover supporting member fastening part 63a includes a penetration hole 63b in which to insert a corresponding one of the joint-fastening bolts 73. The front tank cover 63 is fastened to the cover supporting members 66 by use of the joint-fastening bolts 73 (see FIG. 8) to be inserted in the respective penetration holes 63b.

The front tank cover 63 has the paired tank locking parts 70 (see FIG. 7) on its back surface, the paired tank locking parts 70 spaced out in the vehicle width direction. The tank locking parts 70 are providing protruding from the back surface of the front tank cover 63. As shown in FIG. 6, each tank locking part 70 has a large-diameter part 70a, whose outer diameter is larger, in its front end portion. The large-diameter part 70a is formed so that the tank locking part 70 can be fitted into the locking hole 71a of the elastic member 71 of the corresponding front tank cover locking part 55.

As shown in FIG. 7, the tank locking parts 70 are disposed in such a way as to be opposed to the locking holes 71a of the front tank cover locking parts 55, and are disposed in the rear of the cover supporting member fastening parts 63a.

The front tank cover 63 thus formed can be easily locked to the front tank cover locking parts 55 of the fuel tank 51 without using fastening members such as bolts.

As shown in FIGS. 8 and 9, the front tank side covers 64 are disposed on the respective two sides of the front tank cover 63 in the vehicle width direction. The front tank side covers 64 are those for covering the side lower portions of the fuel tank 51 from its front portions to its substantially central portions in the frontward/rearward direction, respectively, when viewed from the side. As shown in FIG. 9, each front tank side cover 64 is shaped almost like a rectangle, and is concurrently formed in a way to taper toward its front, when viewed from the side. The front tank side covers 64 are each made of a synthetic resin, for example.

Each front tank side cover 64 has a penetration hole (not illustrated) in which to insert the corresponding joint-fastening bolt 73 (see FIG. 8). Together with the front tank cover 63, the front tank side cover 64 is fastened (jointly fastened) to the corresponding cover supporting member 66 by use of the joint-fastening bolt 73 to be inserted in this penetration hole.

As shown in FIG. 8, each front tank side cover 64 includes a recessed part 64a formed in such a way as to be recessed downwardly in the frontward/rearward direction; a drooping wall part 64b extending downwardly from the upper edge of the inner surface opposed to the head pipe 6; a fastening part 64c provided in the drooping wall part 64b; a locking protrusion (not illustrated) formed in such a way as to protrude downwardly from the lower end of the rear portion of the front tank side cover 64; and a locking part 100 provided in the lower end portion of the rear portion of the front tank side cover 64. This recessed part 64a makes it possible to inhibit the rider from feeling a sense of oppression even when the rider turns the handlebar 4 up to its turn limit.

The fastening part 64c fastens together the rear end portion of a head pipe-side inner cover 91a (see FIG. 9), which extends to the rear in the shape of a belt from the rear portion of the front center upper cover 91; the corresponding upper portion of the front upper side cover 95; and the corresponding front tank side cover 64.

The locking protrusion is locked to a locking hole 65c (which will be described later) of the corresponding side cover 65.

The locking part 100 locks the locking protrusion (not illustrated) of the corresponding first front side cowl 96 by use of the resin clip (not illustrated). The rear end portion of the upper portion of the first front side cowl 96 is fixed to the corresponding front tank side cover 64 by use of this locking part 100.

As shown in FIG. 1, FIG. 8, and FIG. 9, the side covers 65 are disposed to continue to the rear portions of the corresponding front tank side covers 64. When viewed from the side, the side covers 65 cover the fuel tank 51 from the lower portions of its substantially central portions to its rear portions in the frontward/rearward direction, and cover the central portions of the vehicle body from the lower end portions of the main seat 85, respectively. Each side cover 65 is shaped almost like a trapezoid (a reverse trapezoid), when viewed from the side. The side cover 65 has the locking hole 65a (see FIG. 5) and two tank locking parts 70 (see FIG. 7) in its back surface.

As shown in FIG. 5, the locking hole 65a is provided in the upper surface of the front end portion of the side cover 65. The locking protrusion (not illustrated) of the corresponding front tank side cover 64 is inserted in the locking hole 65a.

The tank locking parts 70 are formed in such a way as to be capable of engaging with the corresponding cover first locking part 56 (see FIG. 4) and the corresponding cover second locking part 57 (see FIG. 4) of the fuel tank 51, respectively. The side covers 65 are each made of a synthetic resin, for example.

The motorcycle 1 according to the first embodiment, which has been described above, brings about the following effects.

The motorcycle 1 according to the first embodiment includes the vehicle body frame 5; the fuel tank 51; the tank cover 62 for covering at least part of the fuel tank 51; the flange part 53, provided to the fuel tank 51, for fastening the fuel tank 51 to the vehicle body frame 5; and the cover supporting members 66, fastened to the flange part 53, for supporting the tank cover 62.

The tank cover 62 is fastened to the cover supporting members 66 which are fastened to the flange part 53. This means that the tank cover 62 is not directly fastened to the fuel tank 51. Thereby, even when an excessive load is applied to the tank cover 62, it is possible to inhibit the fuel tank 51 from receiving the load. Thus, it is no longer necessary to increase the strength of the fuel tank 51 by taking measures such as increasing the thickness of the fuel tank 51. Accordingly, a reduction in the weight of the fuel tank 51 can be achieved. This further makes it possible to reduce the manufacturing costs of the fuel tank 51.

Furthermore, in the motorcycle 1 according to the first embodiment, the tank cover 62 includes a front tank cover 63 for covering the front portion of the fuel tank 51; and the paired front tank side covers 64, disposed on the two sides of the front tank cover 63 in the vehicle width direction, for covering at least parts of the side surfaces of the fuel tank 51, respectively. In addition, the front tank cover 63 and the front tank side covers 64 are jointly fastened and fixed to the cover supporting members 66, respectively.

For this reason, even in the case where the periphery of the fuel tank 51 is covered the multiple tank covers (the front tank cover 63 and the front tank side covers 64), it is possible to reduce the number of fastening members (for example, bolts or the like). Accordingly, a reduction in the weight of the fuel tank 51 is achieved.

Moreover, in the motorcycle 1 according to the first embodiment, the pair of cover supporting members 66 are disposed with the fastening part (the flange part bolt 53a) interposed in between in the vehicle width direction, the fastening part formed in the flange part 53 and fastened to the vehicle body frame 5; and the cover supporting members 66 are fastened to the flange part 53 by use of their respective single fastening shaft members (the supporting member bolts 68).

For this reason, once an excessive load is applied to the tank cover 62 and this load acts on the cover supporting members 66, the cover supporting members 66 turn on their respective fastening shaft members (the supporting member bolts 68) with respect to the flange part 53. Accordingly, it is possible to ease the load which is applied to the tank cover 62 and the flange part 53.

The motorcycle 1 according to the first embodiment further includes the paired side covers 65 which are disposed to continue to the rear portions of the front tank side covers 64 and which cover at least parts of the side surfaces of the fuel tank 51, respectively. The fuel tank 51 includes the front tank cover locking parts 55 for locking the front tank cover 63, the front tank side covers 64, and the side covers 65. The front tank cover 63, the front tank side covers 64, and the side covers 65 include the tank locking parts 70 configured to engage with the front tank cover locking parts 55.

For this reason, the fuel tank 51 is locked to the front tank cover 63, the front tank side covers 64, and the side covers 65 by making the tank locking parts 70 and the front tank cover locking parts 55 engage with each other. Thereby, even when an excessive load is applied to the front tank cover 63, the front tank side covers 64, and the side covers 65, it is possible to inhibit the load from acting on the fuel tank 51.

Moreover, the clearances between the fuel tank 51 and these covers can be set to a minimum. For this reason, it is possible to make the fuel tank 51 of the motorcycle 1 compact, and to make the external appearance of the motorcycle 1 better.

In addition, in the motorcycle 1 according to the first embodiment, the front tank cover 63 includes the paired cover supporting member fastening parts 63a, which are configured to be fastened to the cover supporting members 66, in its two end portions in the vehicle width direction, respectively. Furthermore, the tank locking parts 70 are disposed in the rear of the respective cover supporting member fastening parts 63a.

For this reason, the two end portions of the front tank cover 63 in the vehicle width direction can be fastened and thereby fixed to the paired cover supporting member fastening parts 63a. Accordingly, even in a case where the weight of the front tank cover 63 is reduced by thinning the front tank cover 63 down, it is possible to inhibit the deformation of the front tank cover 63.

Next, descriptions will be provided for a different embodiment of the present invention. The different embodiment will be described focusing mainly on a point which is different from the first embodiment. Configurations which are the same as those of the first embodiment will be denoted by the same reference numerals, and detailed descriptions for such configurations will be omitted. The descriptions provided for the first embodiment will be appropriately applied to or expanded into the other points which will not be specifically described for the different embodiment.

Figure 10:
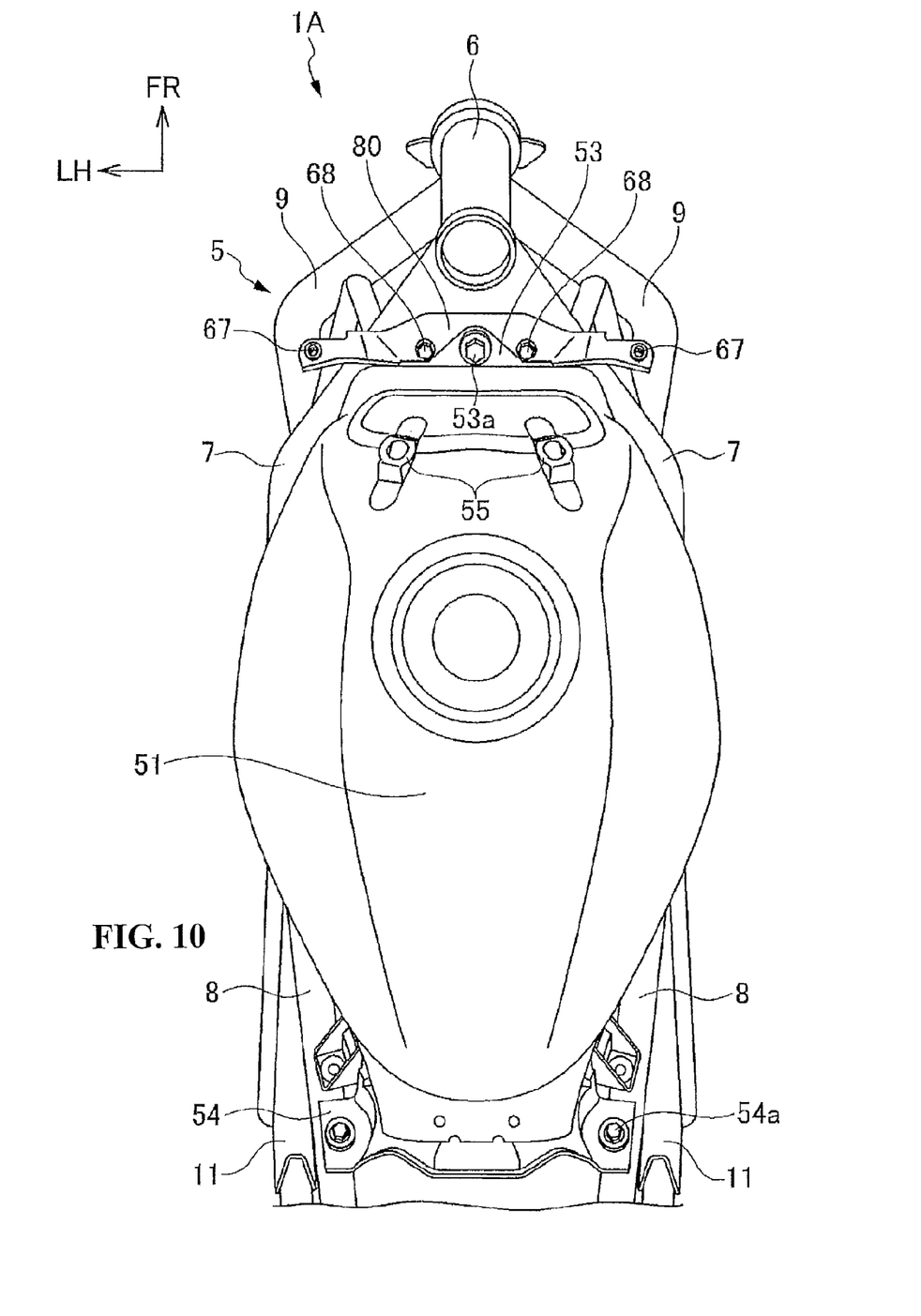
FIG. 10 is a plan view showing a motorcycle according to a second embodiment of the present invention.

Referring to FIG. 10, descriptions will be hereinbelow provided for a second embodiment of the present invention. FIG. 10 is a plan view showing a motorcycle according to the second embodiment of the present invention, wherein the tank cover 62 is not yet attached to the fuel tank 51.

The second embodiment is different from the first embodiment in that while the two cover fastening parts 67 (the cover supporting members 66) according to the first embodiment are formed as the separated bodies, the two cover fastening parts 67 according to the second embodiment are integrally formed in a cover supporting member 80. The other configurations are the same as those of the first embodiment.

More specifically, as shown in FIG. 10, the motorcycle 1A according to the second embodiment includes the cover supporting member 80 instead of the two cover supporting members 66 for the first embodiment. The cover supporting member 80 is a metal-made plate-shaped member extending in the vehicle width direction. The cover supporting member 80 includes two penetration holes (not illustrated) and two cover fasting parts 67. The two penetration holes are those in which to insert the supporting member bolts 68.

The cover fastening parts 67 are those for fastening the tank cover 62 (the front tank cover 63 and the front tank side covers 64) by use of the respective joint-fastening bolts 73 (see FIG. 8). The two cover fastening parts 67 are disposed with the fastening part (the flange part bolt 53a) interposed in between in the vehicle width direction, the fastening part formed in the flange part 53 and fastened to the vehicle frame 5. The two cover fastening parts 67 are integrally formed.

The above-described motorcycle 1A according to the second embodiment brings about the same effects as does the motorcycle 1 according to the first embodiment, as well as the following effects.

In the motorcycle 1A according to the second embodiment, the cover supporting member 80 includes the multiple cover fastening parts 67 for fastening the tank covers (which correspond to the front tank cover 63 and the front tank side covers 64 according to the first embodiment, although not illustrated). In this respect, the multiple cover fastening parts 67 are disposed with the fastening part (the flange part bolt 53a) interposed in between in the vehicle width direction, and are integrally formed, the fastening part formed in the flange part 53 and fastened to the vehicle body frame 5.

For this reason, clearances between the fuel tank 51 and the multiple tank covers (the front tank cover 63 and the front tank side covers 64) can be managed collectively by use of the cover supporting member 80. Accordingly, it is possible to enhance the productivity of the motorcycle 1A.

Although the foregoing descriptions have been provided to the embodiments of the present invention, the present invention is not limited to the above-described embodiments, and may be modified depending on the necessity.

For example, although the first embodiment has been described as that in which the cover supporting members 66 are each formed by appropriately bending the long metal-made plate member as in the illustrated example (FIGS. 3 and 5) depending on the necessity, the present invention is not limited to this. The shape of the cover supporting members 66 may be changed as desired with the shape of the fuel tank 51, the shape of the vehicle body frame 5, and the like taken into consideration.

Furthermore, although the first embodiment and the second embodiment apply the present invention to what is dubbed the full cowl-type motorcycle as the saddle-ride type vehicle, the present invention is not limited to this. For example, the present invention may be applied to three-wheel saddle-ride type vehicles, and four-wheel rough-terrain vehicles. The present invention may be further applied to motorcycles and the like other than the full cowl-type motorcycle. In other words, the saddle-ride type vehicle includes an entire range of vehicles whose vehicle bodies the occupants mount on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
   a vehicle body frame;
   a fuel tank, fixed to the vehicle body frame, for storing fuel;
   a tank cover for covering at least part of the fuel tank;
   a flange part, provided at a forward end of the fuel tank, for fastening the fuel tank to the vehicle body frame; and
   a cover supporting member, fastened to the flange part, for supporting the tank cover,
   wherein the flange part extends to a front of the vehicle, said flange part being a plate extending from a lower end edge portion of a front portion of the fuel tank and being integrally formed therewith.

2. The vehicle according to claim 1, wherein the tank cover comprises:
   a front tank cover for covering a front portion of the fuel tank; and
   paired front tank side covers disposed on two sides of the front tank cover in a vehicle width direction, the paired front tank side covers covering at least parts of side surfaces of the fuel tank, respectively, and the front tank cover and the front tank side covers are jointly fastened and fixed to the cover supporting member.

3. The vehicle according to claim 2, wherein the paired cover supporting members are disposed with a fastening part interposed in between in the vehicle width direction, the fastening part being formed in the flange part and fastened to the vehicle body frame, and each of the cover supporting members is fastened to the flange part by use of a single fastening shaft member.

4. The vehicle according to claim 2, wherein the cover supporting member includes a plurality of cover fastening parts for fastening the tank cover, and the plurality of cover fastening parts are disposed with a fastening part interposed in between in the vehicle width direction, and are integrally formed, the fastening part formed in the flange part and fastened to the vehicle body frame.

5. The vehicle according to claim 4, wherein the front tank cover includes paired cover supporting member fastening parts, which are configured to be fastened to the cover supporting member, in its respective two end portions in the vehicle width direction, and the tank locking parts are disposed in the rear of the respective cover supporting member fastening parts.

6. The vehicle according to claim 2, further comprising paired side covers, disposed to continue to rear portions of the front tank side covers, the side covers covering at least parts of the side surfaces of the fuel tank, respectively, wherein the fuel tank includes cover locking parts for respectively locking the front tank cover, the front tank side covers, and the side covers, and the front tank cover, the front tank side covers, and the side covers each include a tank locking part configured to engage with a corresponding one of the cover locking parts.

7. The vehicle according to claim 6, and further including a penetration aperture formed in the cover locking parts with an elastic member disposed within the penetration aperture with a corresponding tank locking part of the front tank cover being positioned within the penetration aperture.

8. The vehicle according to claim 1, wherein said flange part includes a pair of groove parts formed in a front edge and a penetration hole for inserting a flange bolt for securing the flange part.

9. A tank cover comprising:
   a fuel tank for storing fuel;
   said tank cover covering at least part of the fuel tank;
   a flange part secured to the fuel tank for fastening the fuel tank to a vehicle body frame; and
   a cover supporting member, fastened to the flange part, for supporting the tank Cover,
   wherein the tank cover comprises: a front tank cover for covering a front portion of the fuel tank; and paired front tank side covers disposed on two sides of the front tank cover in a vehicle width direction, the paired front tank side covers covering at least parts of side surfaces of the fuel tank, respectively, and the front tank cover and the front tank side covers are jointly fastened and fixed to the cover supporting member,
   further comprising paired side covers, disposed to continue to rear portions of the front tank side covers, the side covers covering at least parts of the side surfaces of the fuel tank, respectively, wherein the fuel tank includes cover locking parts for respectively locking the front tank cover, the front tank side covers, and the side covers, and the front tank cover, the front tank side covers, and the side covers each include a tank locking part configured to engage with a corresponding one of the cover locking parts.

10. The vehicle according to claim 9, wherein the flange part extends to a front of the vehicle, said flange part being a plate extending from a lower end edge portion of a front portion of the fuel tank and being integrally formed therewith.

11. The tank cover according to claim 9, wherein the paired cover supporting members are disposed with a fastening part interposed in between in a vehicle width direction, the fastening part being formed in the flange part and fastened to a vehicle body frame, and each of the cover supporting members is fastened to the flange part by use of a single fastening shaft member.

12. The tank cover according to claim 9, wherein the cover supporting member includes a plurality of cover fastening parts for fastening the tank cover, and the plurality of cover fastening parts are disposed with a fastening part interposed in between in a vehicle width direction, and are integrally formed, the fastening part formed in the flange part and fastened to a vehicle body frame.

13. The tank cover according to claim 12, wherein the front tank cover includes paired cover supporting member fastening parts, which are configured to be fastened to the cover supporting member, in its respective two end portions in the vehicle width direction, and the tank locking parts are disposed in the rear of the respective cover supporting member fastening parts.

14. The tank cover according to claim 9, and further including a penetration aperture formed in the cover locking parts with an elastic member disposed within the penetration aperture with a corresponding tank locking part of the front tank cover being positioned within the penetration aperture.

15. A tank cover comprising:
   a fuel tank for storing fuel;
   said tank cover covering at least part of the fuel tank;
   a flange part secured to the fuel tank for fastening the fuel tank to a vehicle body frame; and
   a cover supporting member, fastened to the flange part, for supporting the tank cover, wherein the flange part extends to a front of a vehicle, said flange part being a plate extending from a lower end edge portion of a front portion of the fuel tank and being integrally formed therewith.

16. The tank cover according to claim 15, wherein said flange part includes a pair of groove parts formed in a front edge and a penetration hole for inserting a flange bolt for securing the flange part.

* * * * *